US006961845B2

(12) United States Patent
Roussel

(10) Patent No.: US 6,961,845 B2
(45) Date of Patent: *Nov. 1, 2005

(54) SYSTEM TO PERFORM HORIZONTAL ADDITIONS

(75) Inventor: Patrice Roussel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/193,645

(22) Filed: Jul. 9, 2002

(65) Prior Publication Data

US 2003/0050941 A1 Mar. 13, 2003

Related U.S. Application Data

(63) Continuation of application No. 09/053,401, filed on Mar. 31, 1998, now Pat. No. 6,418,529.

(51) Int. Cl.$^7$ .............................................. G06F 9/302
(52) U.S. Cl. ..................................... 712/221; 712/222
(58) Field of Search ................................ 712/221, 222, 712/42, 208; 708/490

(56) References Cited

U.S. PATENT DOCUMENTS

| | | |
|---|---|---|
| 3,711,692 A | 1/1973 | Batcher |
| 3,723,715 A | 3/1973 | Chen et al. |
| 4,161,784 A | 7/1979 | Cushing et al. |
| 4,189,716 A | 2/1980 | Krambeck |
| 4,393,468 A | 7/1983 | New |
| 4,418,383 A | 11/1983 | Doyle et al. |
| 4,498,177 A | 2/1985 | Larson |
| 4,630,192 A | 12/1986 | Wassel et al. |
| 4,707,800 A | 11/1987 | Montrone et al. |
| 4,771,379 A | 9/1988 | Ando et al. |
| 4,785,393 A | 11/1988 | Chu et al. |
| 4,785,421 A | 11/1988 | Takahashi et al. |
| 4,901,270 A | 2/1990 | Galbi et al. |
| 4,989,168 A | 1/1991 | Kuroda et al. |
| 5,095,457 A | 3/1992 | Jeong |
| 5,187,679 A | 2/1993 | Vassiliadis et al. |
| 5,201,056 A | 4/1993 | Daniel et al. |
| 5,327,369 A | 7/1994 | Ashkenazi |
| 5,339,447 A | 8/1994 | Balmer |
| 5,390,135 A | 2/1995 | Lee et al. |
| 5,418,736 A | 5/1995 | Widigen et al. |
| 5,442,799 A | 8/1995 | Murakami et al. |
| 5,448,703 A | 9/1995 | Amini et al. |

(Continued)

FOREIGN PATENT DOCUMENTS

| | | |
|---|---|---|
| EP | 0 318 957 | 11/1998 |
| WO | WO 97/23821 | 7/1997 |

OTHER PUBLICATIONS

MIPS Extension for Digital Media with 3D, MIPS Technology, Inc., Mar. 12, 1997, pp 0–26.

A Procesor Architecture for 3D Graphics Calculations, Yulun Wang, Amante Manager, Partha Srinivasan, Computer Motion, Inc., pp 1–23.

Parallel Computers for Graphics Applications (Proceedings: Second International Conference . . . ), Levinthal, et al., 1987, pp 193–198.

Primary Examiner—David Y. Eng
(74) Attorney, Agent, or Firm—Larry M. Mennemeier

(57) ABSTRACT

A method and apparatus for including in a processor instructions for performing intra-add operations on packed data. In one embodiment, a processor is coupled to a memory. The memory has stored therein a first packed data. The processor performs operations on data elements in the first packed data to generate a plurality of data elements in a second packed data in response to receiving an instruction. At least two of the plurality of data elements in the second packed data store the result of an intra-add operation on data elements in the first packed data.

50 Claims, 13 Drawing Sheets

INTRA-ADD: IRESULT1-IRESULT1; I RESULT2-IRESULT2

| 127 | 96 95 | 64 63 | 32 31 | 0 | |
|---|---|---|---|---|---|
| $A_{14}X_4$ | $A_{13}X_3$ | $A_{12}X_2$ | $A_{11}X_1$ | | IResult1 |

| 127 | 96 95 | 64 63 | 32 31 | 0 | |
|---|---|---|---|---|---|
| $A_{24}X_4$ | $A_{23}X_3$ | $A_{22}X_2$ | $A_{21}X_1$ | | IResult2 |

| 127 | 96 95 | 64 63 | 32 31 | 0 |
|---|---|---|---|---|
| $A_{24}X_4+A_{23}X_3$ | $A_{22}X_2+A_{21}X_1$ | $A_{14}X_4+A_{13}X_3$ | $A_{12}X_2+A_{11}X_1$ | |

IAResult1

U.S. PATENT DOCUMENTS

| | | |
|---|---|---|
| 5,517,626 A | 5/1996 | Archer et al. |
| 5,530,661 A | 6/1996 | Garbe et al. |
| 5,537,601 A | 7/1996 | Kimura et al. |
| 5,586,070 A | 12/1996 | Purcell |
| 5,677,862 A | 10/1997 | Peleg et al. |
| 5,678,009 A | 10/1997 | Bains et al. |
| 5,721,697 A | 2/1998 | Lee |
| 5,721,892 A | 2/1998 | Peleg et al. |
| 5,815,421 A | 9/1998 | Dulong et al. |
| 5,819,117 A | 10/1998 | Hansen |
| 5,822,232 A | 10/1998 | Dulong et al. |
| 5,859,790 A | 1/1999 | Sidwell |
| 5,862,067 A | 1/1999 | Mennemeier et al. |
| 5,875,355 A | 2/1999 | MacKenzie et al. |
| 5,880,984 A | 3/1999 | Burchfiel et al. |
| 5,880,985 A | 3/1999 | Makineni et al. |
| 5,883,824 A | 3/1999 | Lee et al. |
| 5,887,186 A | 3/1999 | Nakanishi |
| 5,901,301 A | 5/1999 | Matsuo et al. |
| 5,918,062 A | 6/1999 | Oberman et al. |
| 5,983,257 A | 11/1999 | Dulong et al. |
| 6,006,316 A | 12/1999 | Dinkjian |
| 6,014,684 A | 1/2000 | Hoffman |
| 6,014,735 A | 1/2000 | Chennupaty et al. |
| 6,041,404 A | 3/2000 | Roussel et al. |
| 6,115,812 A | 9/2000 | Abdallah et al. |
| 6,122,725 A | 9/2000 | Roussel et al. |
| 6,211,892 B1 | 4/2001 | Huff et al. |
| 6,212,618 B1 | 4/2001 | Roussel |
| 6,230,253 B1 | 5/2001 | Roussel et al. |
| 6,230,257 B1 | 5/2001 | Roussel et al. |
| 6,288,723 B1 | 9/2001 | Huff et al. |

FIGURE 1
(PRIOR ART)

Source1: bits 127–96 $X_3$, 95–64 $X_2$, 63–32 $X_1$, 31–0 $X_0$
Source2: bits 127–96 $Y_3$, 95–64 $Y_2$, 63–32 $Y_1$, 31–0 $Y_0$
Result: bits 127–96 $X_3+Y_3$, 95–64 $X_2+Y_2$, 63–32 $X_1+Y_1$, 31–0 $X_0+Y_0$

FIGURE 2

Source1: bits 127–96 $X_3$, 95–64 $X_2$, 63–32 $X_1$, 31–0 $X_0$
Source2: bits 127–96 $Y_3$, 95–64 $Y_2$, 63–32 $Y_1$, 31–0 $Y_0$
Result: bits 127–96 $Y_3+Y_2$, 95–64 $Y_1+Y_0$, 63–32 $X_3+X_2$, 31–0 $X_1+X_0$ MULTIPLY - SOURCE 1, SOURCE 2
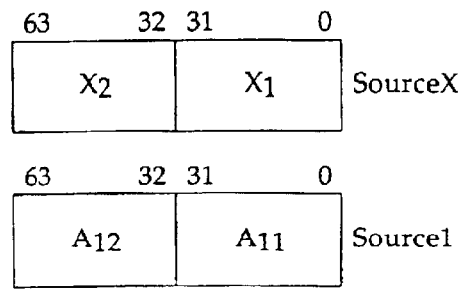
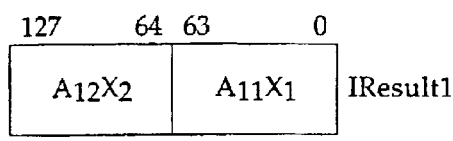
FIGURE 3A
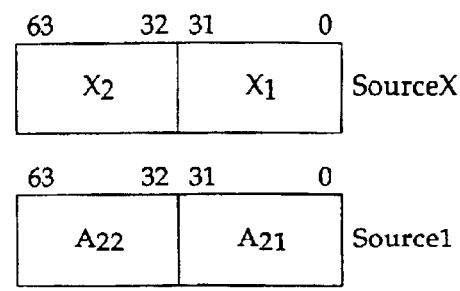
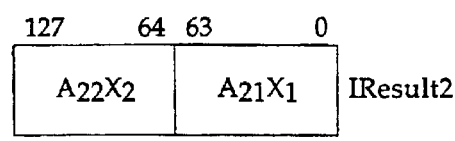
FIGURE 3B

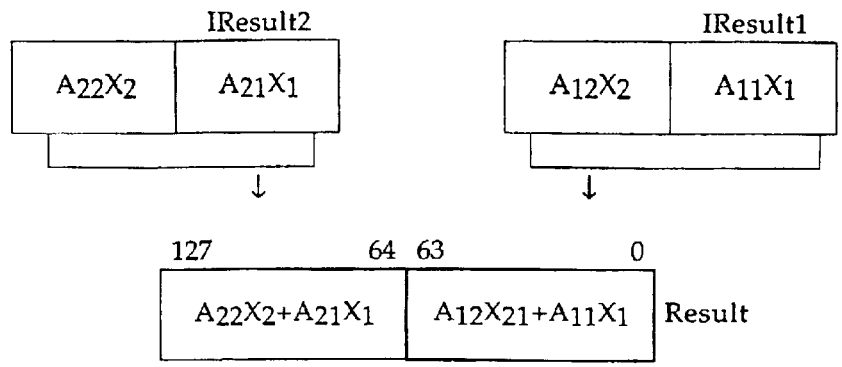
FIGURE 3C
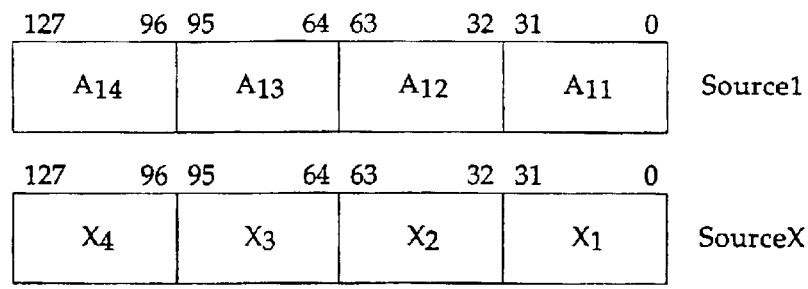
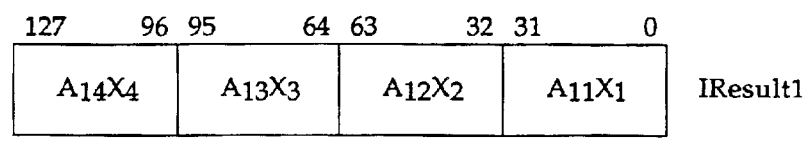
FIGURE 4A

| 127 96 | 95 64 | 63 32 | 31 0 | |
|---|---|---|---|---|
| A24 | A23 | A22 | A21 | Source2 |

| 127 96 | 95 64 | 63 32 | 31 0 | |
|---|---|---|---|---|
| X4 | X3 | X2 | X1 | SourceX |

| 127 96 | 95 64 | 63 32 | 31 0 | |
|---|---|---|---|---|
| A24X4 | A23X3 | A22X2 | A21X1 | IResult2 |

FIGURE 4B

| 127 96 | 95 64 | 63 32 | 31 0 | |
|---|---|---|---|---|
| A34 | A33 | A32 | A31 | Source3 |

| 127 96 | 95 64 | 63 32 | 31 0 | |
|---|---|---|---|---|
| X4 | X3 | X2 | X1 | SourceX |

| 127 96 | 95 64 | 63 32 | 31 0 | |
|---|---|---|---|---|
| A34X4 | A33X3 | A32X2 | A31X1 | IResult3 |

FIGURE 4C

| 127 | 96 95 | 64 63 | 32 31 | 0 | |
|---|---|---|---|---|---|
| A₄₄ | A₄₃ | A₄₂ | A₄₁ | | Source4 |

| 127 | 96 95 | 64 63 | 32 31 | 0 | |
|---|---|---|---|---|---|
| X₄ | X₃ | X₂ | X₁ | | SourceX |

| 127 | 96 95 | 64 63 | 32 31 | 0 | |
|---|---|---|---|---|---|
| A₄₄X₄ | A₄₃X₃ | A₄₂X₂ | A₄₁X₁ | | IResult4 |

FIGURE 4D

INTRA-ADD: IRESULT1-IRESULT1; I RESULT2-IRESULT2

| 127   96 | 95   64 | 63   32 | 31   0 | |
|---|---|---|---|---|
| $A_{14}X_4$ | $A_{13}X_3$ | $A_{12}X_2$ | $A_{11}X_1$ | IResult1 |

| 127   96 | 95   64 | 63   32 | 31   0 | |
|---|---|---|---|---|
| $A_{24}X_4$ | $A_{23}X_3$ | $A_{22}X_2$ | $A_{21}X_1$ | IResult2 |

| 127   96 | 95   64 | 63   32 | 31   0 |
|---|---|---|---|
| $A_{24}X_4+A_{23}X_3$ | $A_{22}X_2+A_{21}X_1$ | $A_{14}X_4+A_{13}X_3$ | $A_{12}X_2+A_{11}X_1$ |

IAResult1

FIGURE 4E

INTRA-ADD: IRESULT3-IRESULT3; I RESULT4-IRESULT4

| 127   96 | 95   64 | 63   32 | 31   0 | |
|---|---|---|---|---|
| A34X4 | A33X3 | A32X2 | A31X1 | IResult3 |

| 127   96 | 95   64 | 63   32 | 31   0 | |
|---|---|---|---|---|
| A44X4 | A43X3 | A42X2 | aA41X1 | IResult4 |

| 127   96 | 95   64 | 63   32 | 31   0 | |
|---|---|---|---|---|
| A44X4+A43X3 | A42X2+A41X1 | A34X4+A33X3 | A32X2+A31X1 | |

IAResult2

FIGURE 4F

INTRA-ADD

| 127 96 | 95 64 | 63 32 | 31 0 |
|---|---|---|---|
| $A_{24}X_4+A_{23}X_3$ | $A_{22}X_2+A_{21}X_1$ | $A_{14}X_4+A_{13}X_3$ | $A_{12}X_2+A_{11}X_1$ |

IAResult1

| 127 96 | 95 64 | 63 32 | 31 0 |
|---|---|---|---|
| $A_{44}X_4+A_{43}X_3$ | $A_{42}X_2+A_{41}X_1$ | $A_{34}X_4+A_{33}X_3$ | $A_{32}X_2+A_{31}X_1$ |

IAResult2

| 127 96 | 95 64 | 63 32 | 31 0 |
|---|---|---|---|
| $A_{44}X_4+A_{43}X_3+$ $A_{42}X_2+A_{41}X_1$ | $A_{34}X_4+A_{33}X_3+$ $A_{32}X_2+A_{31}X_1$ | $A_{24}X_4+A_{23}X_3+$ $A_{22}X_2+A_{21}X_1$ | $A_{14}X_4+A_{13}X_3+$ $A_{12}X_2+A_{11}X_1$ |

Result

FIGURE 4G

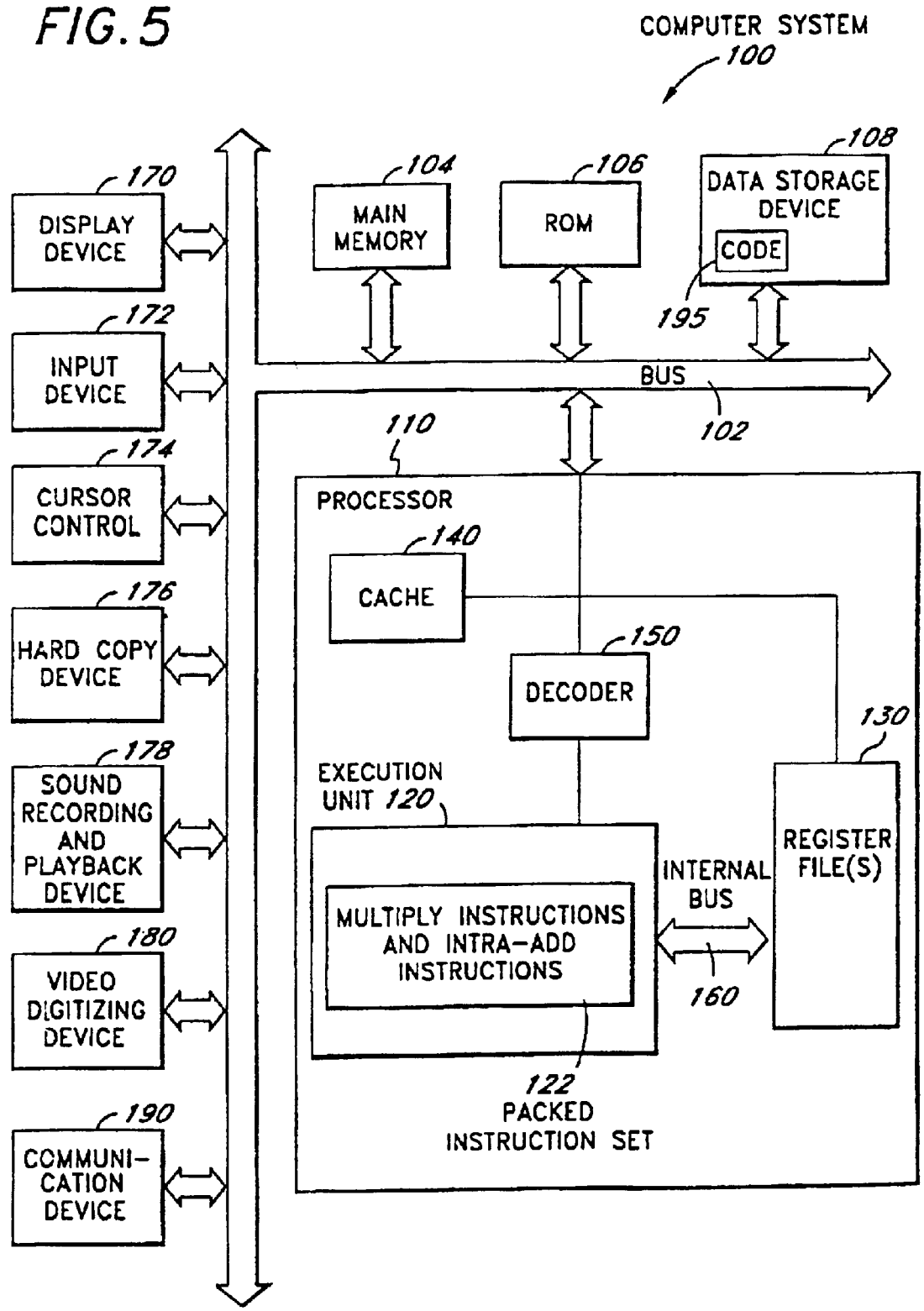

SYSTEM TO PERFORM HORIZONTAL ADDITIONS

This application is a continuation and claims the benefit of application Ser. No. 09/053,401, filed Mar. 31, 1998, now U.S. Pat. No. 6,418,529.

BACKGROUND OF THE INVENTION

1. Field of the Invention

The present invention relates in general to the field of computer systems, and in particular, to an apparatus and method for performing multi-dimensional computations based on an intra-add operation.

2. Description of the Related Art

To improve the efficiency of multimedia applications, as well as other applications with similar characteristics, a Single Instruction, Multiple Data (SIMD) architecture has been implemented in computer systems to enable one instruction to operate on several operands simultaneously, rather than on a single operand. In particular, SIMD architectures take advantage of packing many data elements within one register or memory location. With parallel hardware execution, multiple operations can be performed on separate data elements with one instruction, resulting in significant performance improvement.

Currently, the SIMD addition operation only performs "vertical" or inter-register addition, where pairs of data elements, for example, a first element $X_n$ (where n is an integer) from one operand, and a second element $Y_n$ from a second operand, are added together. An example of such a vertical addition operation is shown in FIG. 1, where the instruction is performed on the sets of data elements ($X_3$, $X_2$, $X_1$ and $X_0$) and ($Y_3$, $Y_2$, $Y_1$, and $Y_0$) accessed as Source1 and Source2, respectively to obtain the result ($X_3+Y_3$, $X_2+Y_2$, $X_1+Y_1$, and $X_0+Y_0$).

Although many applications currently in use can take advantage of such a vertical add operation, there are a number of important applications which would require the rearrangement of the data elements before the vertical add operation can be implemented so as to provide realization of the application.

For example, a matrix multiplication operation is shown below.

MATRIX A ∗ VECTOR X = VECTOR Y $$\begin{vmatrix} A_{14} & A_{13} & A_{12} & A_{11} \\ A_{24} & A_{23} & A_{22} & A_{21} \\ A_{34} & A_{33} & A_{32} & A_{31} \\ A_{44} & A_{43} & A_{42} & A_{41} \end{vmatrix} \otimes \begin{vmatrix} X_4 \\ X_3 \\ X_2 \\ X_1 \end{vmatrix} = \begin{vmatrix} A_{14}X_4 + A_{13}X_3 + A_{12}X_2 + A_{11}X_1 \\ A_{24}X_4 + A_{23}X_3 + A_{22}X_2 + A_{21}X_1 \\ A_{34}X_4 + A_{33}X_3 + A_{32}X_2 + A_{31}X_1 \\ A_{44}X_4 + A_{43}X_3 + A_{42}X_2 + A_{41}X_1 \end{vmatrix}$$

To obtain the product of the matrix A with a vector X to obtain the resulting vector Y, instructions are used to: 1) store the columns of the matrix A as packed operands (this typically requires rearrangement of data because the rows of the matrix A coefficients are stored to be accessed as packed data operands, not the columns); 2) store a set of operands that each have a different one of the vector X coefficients in every data element; 3) use vertical multiplication where each data element in the vector X (i.e., $X_4$, $X_3$, $X_2$, $X_1$) has to be first multiplied with data elements in each column (for example, [$A_{14}$, $A_{24}$, $A_{34}$, $A_{44}$]) of the matrix A. The results of the multiplication operations are then added together through three vertical add operations such as that shown in FIG. 1, to obtain the final result. Such a matrix multiplication operation based on the use of vertical add operations typically requires 20 instructions to implement, an example of which is shown below in Table 1.

Exemplary Code Based on Vertical-Add Operations:

TABLE 1

Assumptions:

1/X stored with X1 first, X4 last
2/transposed of A sotred with A11 first, A21 second, A31 third, etc.
3/availability of:
    -DUPLS: duplicate once
    -DUPLD: duplicate twice

```
MOVD      mm0, <mem_X>              // [0, 0, 0, X1]
DUPLS     mm0, mm0                  // [0, 0, X1, X1]
DUPLD     mm0, mm0                  // [X1, X1, X1, X1]
     PFMUL      mm0, <mem_A>        // [A41*X1, A31*X1, A21*X1, A11*X1]
MOVD      mm1, <mem_X + 4>          // [0, 0, 0, X2]
DUPLS     mm1, mm1                  // [0, 0, X2, X2]
DUPLD     mm1, mm1                  // [X2, X2, X2, X2]
     PFMUL      mm1, <mem_A + 16>   // [A42*X2, A32*X2, A22*X2, A12*X2]
MOVD      mm2, <mem_X + 8>          // [0, 0, 0, X3]
DUPLS     mm2, mm2                  // [0, 0, X3, X3]
DUPLD     mm2, mm2                  // [X3, X3, X3, X3]
     PFUML      mm2, <mem_A + 32>   // [A43*X3, A33*X3, A23*X3, A13*X3]
MOVD      mm3, <mem_X + 12>         // [0, 0, 0, X4]
DUPLS     mm3, mm3                  // [0, 0, X4, X4]
DUPLD     mm3, mm3                  // [X4, X4, X4, X4]
     PFMUL      mm3, <mem_A + 48>   // [A44*X4, A34*X4, A24*X4, A14*X4]
     PFADD      mm0, mm1            // [A42*X2 + A41*X1, A32*X2 + A31*X1,
                                    // A22*X2 + A21*X1, A12*X2 + A11*X1]
     PFADD      mm2, mm3            // [A44*X4 + A43*X3, A34*X4 + A33*X3,
                                    // A24*X4 + A23*X3, A14*X4 + A13*X3]
     PFADD      mm0, mm2            // [A44*X4 + A43*X3 + A42*X2 + A41*X1,
                                    // A34*X4 + A33*X3 + A32*X2 + A31*X1,
                                    // A24*X4 + A23*X3 + A22*X2 + A21*X1,
                                    // A14*X4 + A13*X2 + A12*X2 + A11*X1]
MOVDQ     <mem_Y>, mm0              // store [Y4, Y3, Y2, Y1]
```

Accordingly, there is a need in the technology for providing an apparatus and method which efficiently performs multi-dimensional computations based on a "horizontal" or intra-add operation. There is also a need in the technology for a method and operation for increasing code density by eliminating the need for the rearrangement of data elements and the corresponding rearrangement operations.

BRIEF SUMMARY OF THE INVENTION

A method and apparatus for including in a processor instructions for performing intra-add operations on packed data is described. In one embodiment, a processor is coupled to a memory. The memory has stored therein a first packed data. The processor performs operations on data elements in the first packed data to generate a plurality of data elements in a second packed data in response to receiving an instruction. At least two of the plurality of data elements in the second packed data store the result of an intra-add operation on data elements in the first packed data.

BRIEF DESCRIPTION OF THE DRAWINGS

The invention is illustrated by way of example, and not limitation, in the figures. Like reference indicate similar elements.

FIG. 1 illustrates the vertical or inter-add operation of the prior art.

FIG. 2 illustrates the horizontal or intra-add operation in accordance with one embodiment of the present invention.

FIGS. 3A–3C illustrate matrix multiplication based on horizontal or intra-add operations in accordance with one embodiment of the present invention.

FIGS. 4A–4G illustrate matrix multiplication based on horizontal or intra-add operations in accordance with another embodiment of the present invention.

FIG. 5 illustrates an exemplary computer system in accordance with one embodiment of the invention.

DETAILED DESCRIPTION OF THE INVENTION

Figure 6:
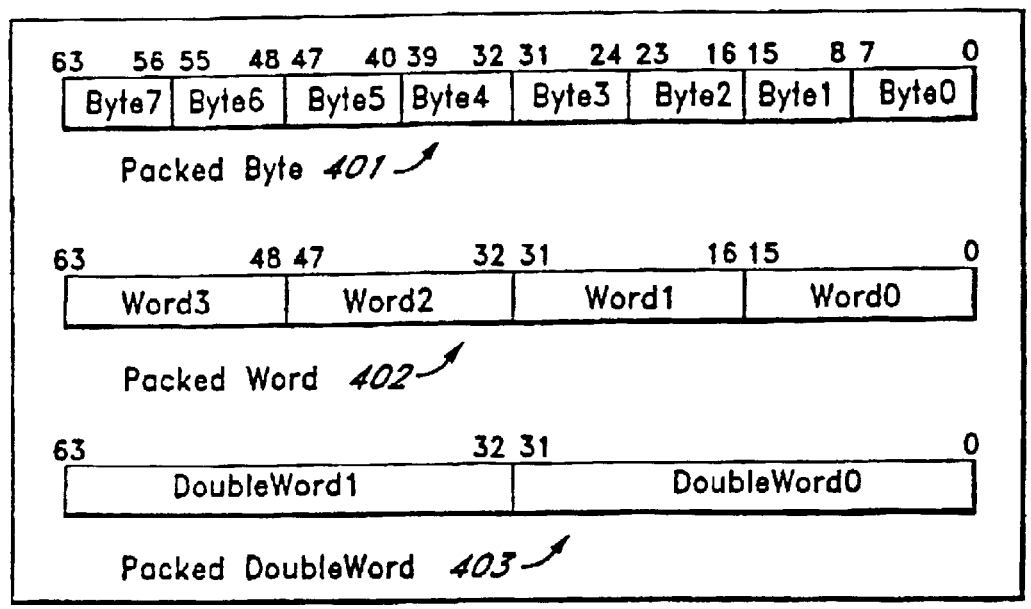
FIG. 6 illustrates packed data-types in accordance with one embodiment of the invention.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Overview

One aspect of the present invention is a processor including instructions for performing horizontal or intra-addition operations on packed data. In one embodiment, two pairs of data elements (e.g., $X_3$ and $X_2$, and $X_1$ and $X_0$) located within a single storage area (e.g., Source1) are added together using a horizontal or a intra-add operation. In an alternate embodiment, data elements from each of two storage areas (e.g., Source1 and Source2) are added and stored as data elements of a resulting packed data, as shown in FIG. 2.

Another aspect of the present invention involves a method and apparatus for performing matrix multiplication using a horizontal or intra-addition operation. In one embodiment, each 32-bit data element from a 1×2 vector is multiplied with corresponding 32-bit data elements from each row of a 2×2 matrix, as shown in FIGS. 3A and 3B, generating two pairs of 64-bit intermediate results, each pair of which are stored in separate storage areas. An intra-add operation is performed on each pair of the intermediate results to generate a pair of data elements, which are stored as a packed result, as shown in FIG. 3C. The example on FIGS. 3A–3C illustrate the application of one embodiment of the present invention using an integer data format in which the full width of the result is stored in a result register. In alternative embodiments, the result register is the same size as the source register.

The operation of a further example of a matrix multiplication operation based on intra-add operations is shown in FIGS. 4A through 4G, and is representative of a multiplication operation between a 4×4 matrix and a 4×1 vector (such as the multiplication of a 4×4 matrix A with a 4×1 vector X to provide a 4×1 vector Y as described earlier). In particular, each data element from a 4×1 vector is multiplied with the corresponding data elements from each row of a 4×4 matrix, as shown in FIGS. 4A through 4D.

A first pair of intra-add operations are then performed on the initial resulting data elements (IResult1+IResult2, IResult3+IResult4), as shown in FIG. 4E and 4F; followed by a second single intra-add operation on the results of the first intra-add operations (IAResult1+IAResult2), to obtain the final result (Result) as shown in FIG. 4G.

Although the examples illustrated in FIGS. 4A–4G are floating point examples, the present invention may also be applied to packed integer data. Matrix multiplication based on horizontal add or intra-add operations only requires 12 instructions, as compared to the typical 20 instructions required when the same matrix multiplication is performed using vertical add or intra-add operations. Exemplary code for implementing matrix multiplication based on horizontal add or intra-add operations is shown in Table 2: Exemplary Code Based on Horizontal-Add Operations PFADDM represents the Intra-add instruction of the present invention.

TABLE 2

Assumptions:

1/X stored with X1 first, X2 second, . . . , X4 last
2/A stored with A11 first, A12 second, A13 third, etc.

| | | |
|---|---|---|
| MOVDQ | mm0, <mem_X> | // [X4, X3, X2, X1] |
| MOVDQ | mm3, mm0 | |
| PFMUL | mm0 <mem_A> | // [A14*X4, A13*X3, A12*X2, A11*X1] |
| MOVDQ | mm1, mm3 | |
| PFMUL | mm1 <mem_A + 16> | // [A24*X4, A23*X3, A22*X2, A21*X1] |
| MOVDQ | mm2, mm3 | |
| PFMUL | mm2 <mem_A + 32> | // [A34*X4, A33*X3, A32*X2, A31*X1] |
| PFMUL | mm3 <mem_A + 48> | // [A44*X4, A43*X3, A42*X2, A41*X1] |
| PFADDM | mm0, mm1 | // [A24*X4 + A23*X3, A22*X2 + A21*X1, |
| | | // A14*X4 + A13*X3, A12*X2 + A11*X1] |
| PFADDM | mm2, mm3 | // [A44*X4 + A43*X3, A42*X2 + A41*X1, |
| | | // A34*X4 + A33*X3, A32*X2 + A31*X1] |
| PFADDM | mm0, mm2 | // [A44*X4 + A43*X3 + A42*X2 + A41*X1, |
| | | // A34*X4 + A33*X3 + A32*X2 + A31*X1], |
| | | // A24*X4 + A23*X3 + A22*X2 + A21*X1, |
| | | // A14*X4 + A13*X3 + A12*X2 + A11*X1] |
| MOVDQ | <mem_Y>, mm0 | // store [Y4, Y3, Y2, Y1] |

Although the discussions above pertain to a horizontal-add or inter-add instruction, alternative embodiments could in addition to, or in place of the intra-add instruction, have an inter-subtract instruction or element operation. In this case, one of a pair of data elements within a packed data will be subtracted from a second element of the pair of data elements to accomplish the inter-subtract operations.

In addition, although the discussions above pertain to packed operands that have four data elements, alternative embodiments may involve packed operands that have at least two data elements (i.e., that are double wide).

Computer System

FIG. 5 illustrates one embodiment of a computer system 100 which implements the principles of the present invention. Computer system 100 comprises a bus 102 for communicating information, and a processor 110 for processing information. In one embodiment, the bus 102 may be any communications hardware and/or software for communicating information. The processor 110 represents a central processing unit of any type of architecture, examples of which include a CISC, a RISC or a VLIW type architecture. Computer system 100 further comprises a main memory 104 that is coupled to bus 102, for storing information and instructions to be executed by the processor 110. Computer system 110 also comprises a read only memory (ROM) 106 and/or other status storage device, coupled to the bus 102 for storing information and instructions for access and execution by processor 110. In addition, computer system 110 comprises a data storage device 108 that is coupled to the bus 102 for storing information and instructions.

As shown in FIG. 5, processor 110 comprises an execution unit 120, a set of register file(s) 130, a cache memory 140, a decoder 150 and an internal bus 160. The processor 110 also includes additional circuitry (not shown) which is not necessary to the understanding of the present invention.

Execution unit 120 is used for executing instructions received by processor 110. In addition to recognizing instructions typically implemented in general purpose processors, execution unit 120 recognizes instructions in packed instruction set 122 for performing operations on packed data formats. Packed instruction set 122 includes instructions for supporting intra-add and multiply operations. In addition, packed instruction set 122 may also include other packed instructions.

Execution unit 120 is coupled to register file 130 by internal bus 160. Register file 130 represents a storage area on processor 110 for storing information, including data. It is understood that the aspects of the invention are the described intra-add instruction set and a code sequence for performing matrix multiplication for operating on packed data. According to these aspects of the invention, the storage area used for storing the packed data is not critical. Execution unit 120 is coupled to cache 140 and decoder 150. Cache 140 is used to cache data and/or control signals (such as instructions) from, for example, main memory 104. Decoder 150 is used for decoding instructions received by processor 110 into control signals and/or microcode entry points. In response to these control signals and/or microcode entry points, execution unit 120 performs the appropriate operations. Decoder 150 may be implemented using any number of different mechanisms (e.g., a look-up table, a hardware implementation, a PLA, etc.).

FIG. 5 additionally shows a data storage device 108, (e.g., a magnetic disk, optical disk, and/or other machine readable media) coupled to computer system 100. In addition, the data storage device 108 is shown including code 195 for execution by the processor 110. The code 195 can be written to cause the processor 110 to perform matrix multiplication with the intra-add instruction for any number of purposes (e.g., 3-D graphics multiplication, 3-D transformation, 3-D rotation, 3-D scaling, etc.). Computer system 100 can also be coupled via bus 102 to a display device 170, a user input device 172, a hard copy device 176, a sound recording and/or playback device 178, a video digitizing device 180, and/or a communications device 190 (e.g., a serial communications chip, an ethernet chip or a modem, which provides communications with an external device or network).

Data and Storage Formats

Generally, a data element is an individual piece of data that is stored in a single register (or memory location) with other data elements of the same length. The number of data elements stored in a register is the number of bits supported by the packed data format (e.g., 64 bits for integer packed data) divided by the length in bits of a data element. While any number of packed data formats can be used, FIGS. 6–7, respectively, illustrate integer and floating-point packed data-types according to one embodiment of the invention.

Three integer packed data formats are illustrated in FIG. 6: packed byte 401, packed word 402, and packed doubleword 403. While in one embodiment, each of the packed data formats in FIG. 6 can be either signed or unsigned formats, alternative embodiments support only signed or unsigned formats. Packed byte 401, in one embodiment of the invention, is sixty-four bits long containing eight data elements. Each data element is one byte long. Packed word 402 is sixty-four bits long and contains four word 402 data elements. Each word 402 data element contains sixteen bits of information. Packed doubleword 403 is sixty-four bits long and contains two doubleword 403 data elements. Each doubleword 403 data element contains thirty-two bits of information.

Figure 7:
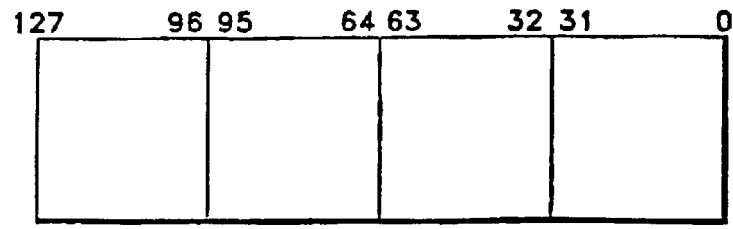
FIG. 7 illustrates one embodiment of a floating point packed data format.

FIG. 7 shows one floating point packed data format having four 32-bit data elements. While one floating point packed data format is illustrated, alternative embodiments could support a different and/or additional floating point packed data formats.

Intra-Add Operations(s)

In one embodiment of the invention, the SRC1 register contains packed data (Source1), the SRC2 register contains packed data (Source2) and the DEST register will contain the result (Result) of performing the horizontal add instruction on Source1 and Source2. In the first step of the horizontal add instruction, one or more pairs of data elements from Source1 are summed together. Similarly, one or more pairs of data elements from Source2 are summed together. The results of the instruction are then stored in the DEST register.

Figure 8:
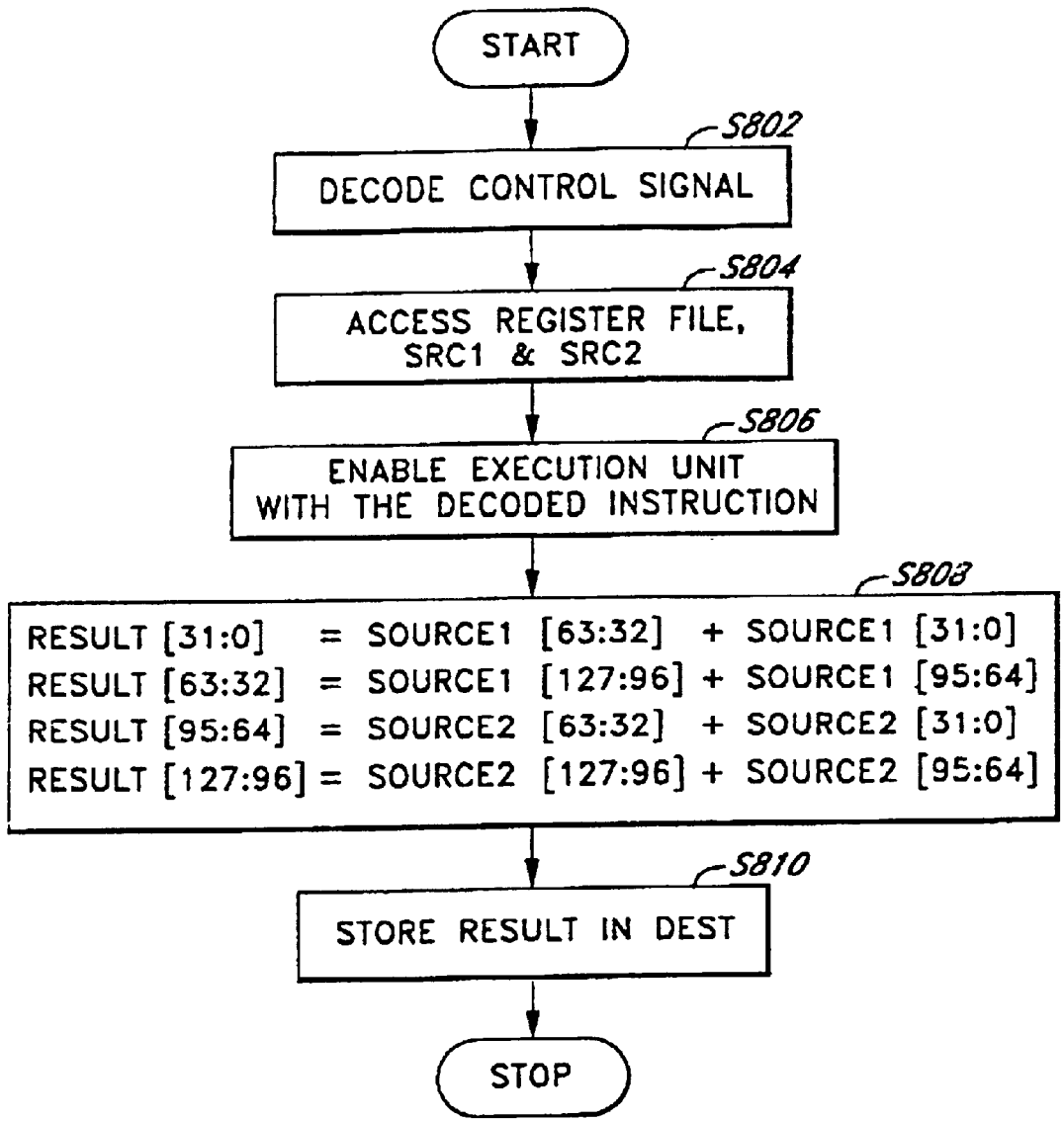
FIG. 8 is a flow diagram illustrating a method for performing the intra-add operation of FIG. 2 in accordance with one embodiment of the invention.

FIG. 8 is a flow diagram illustrating a process S800 for performing the intra-add operation of FIG. 2 according to one embodiment of the present invention. The process S800 begins from a start state and proceeds to process step S802, where the decoder 150 decodes the control signal received by processor 110. In particular, the decoder 150 decodes the operation code for the intra-add instruction.

The process S800 then advances to process step S804, where the device 150 accesses registers in register file 130 given the SRC1 602 and SRC2 603 addresses. Register file 130 provides the execution unit 120 with the packed data stored in the SRC1 602 register (Source1), and the packed data stored in SRC2 603 register (Source2).

The process S800 proceeds to process step S806, where the decoder 150 enables the execution unit 120 to perform the instruction. Next, the process S800 performs the following series of steps, as shown in process step S808 and FIG. 2. Source1 bits thirty-one through zero are added to Source1 bits sixty-three through thirty-two, generating a first 32-bit result (Result[31:0]). Source1 bits ninety-five through sixty-four are added to Source1 bits one hundred-and-twenty-seven through ninety-six, generating a second 32-bit result (Result[63:32]). Source2 bits thirty-one through zero are added to Source2 bits sixty-three through thirty-two, generating a first 32-bit result (Result[95:64]). Source2 bits ninety-five through sixty-four are added to Source1 bits one hundred-and-twenty-seven through ninety-six, generating a second 32-bit result (Result[127:96]).

The process S800 advances to process step S810, where the results of the intra-add instruction are stored in DEST. The process S800 then terminates. Of course, the method of FIG. 8 can be easily altered to describe the horizontal addition of other packed data formats.

Exemplary Intra-add Circuit

In one embodiment, the intra-add instructions can execute on multiple data elements in the same number of clock cycles as an inter-add operation on unpacked data. To achieve execution in the same number of clock cycles, parallelism is used.

Figure 9:
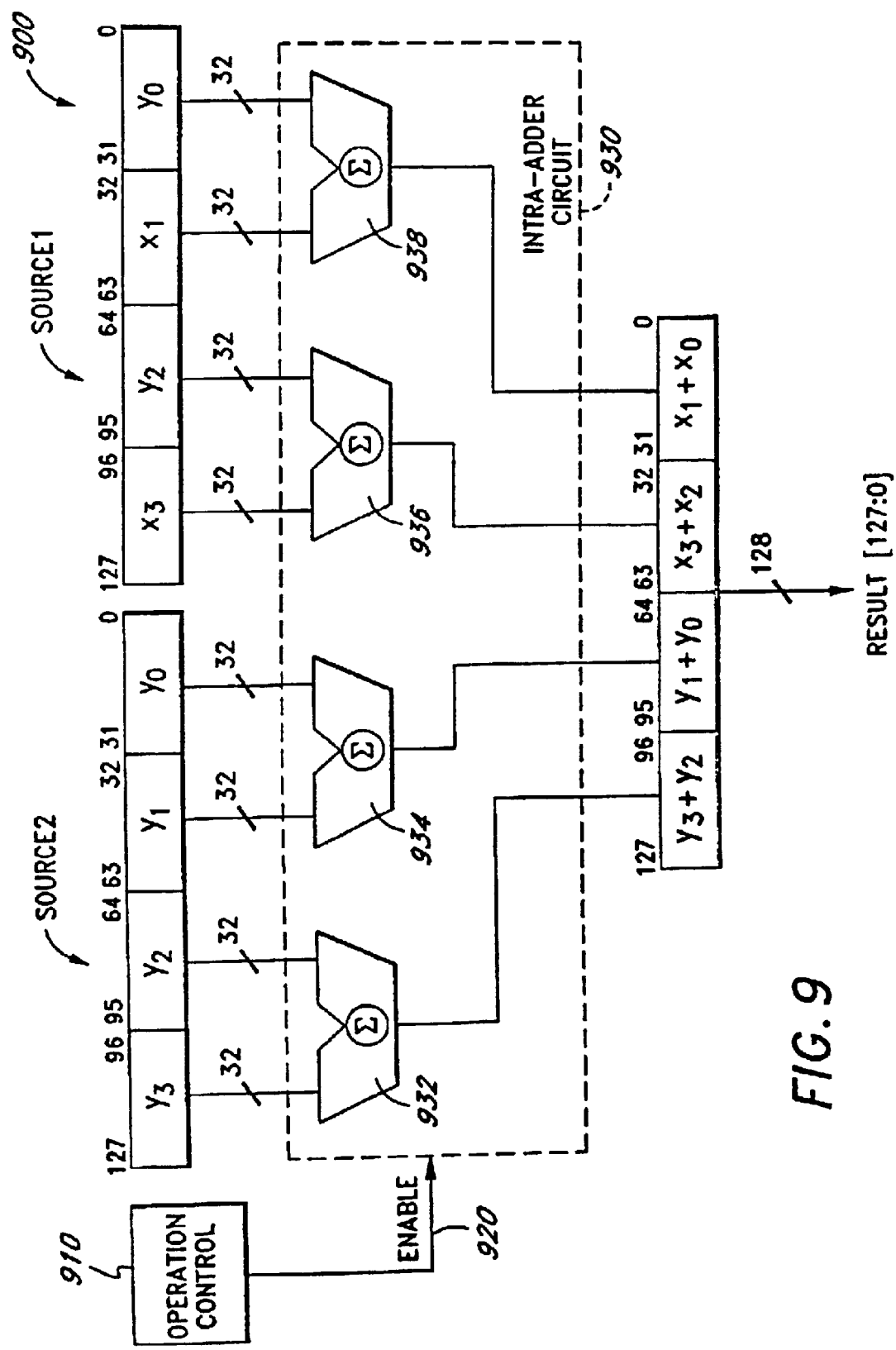
FIG. 9 illustrates a circuit for performing the intra-add operation of FIG. 2 in accordance with one embodiment of the invention.

FIG. 9 illustrates a circuit 900 for performing intra-add operation of FIG. 2 according to one embodiment of the invention. Operation control 910 processes the control signal for the intra-add operations. Operation control 910 outputs signals via signal line 920 to control intra-adder 930.

The intra-adder 930 receives inputs from Source1[127:0], Source2[127:0], and Enable 920. The intra-adder 930 includes four adder circuits 932, 934, 936 and 938. Adder 932 receives inputs from Source2[127:64], adder 934 receives inputs from Source2[63:0], adder 936 receives inputs from Source1[127:64], while adder 938 receives inputs from Source1[63:0]. When enabled, the adders 932, 934, 936 and 938 sum their respective inputs, and each generates a 32-bit output. The results of the addition by adder 932 (i.e., Result[127:96]), adder 934 (i.e., Result [95:64], by adder 936 (i.e., Result[63:32]), and by adder 938 (i.e., Result[31:0]) are combined into the 128-bit Result and communicated to the Result Register 940.

Matrix Multiplication Using Intra-Add Operation(S)

Figure 10:
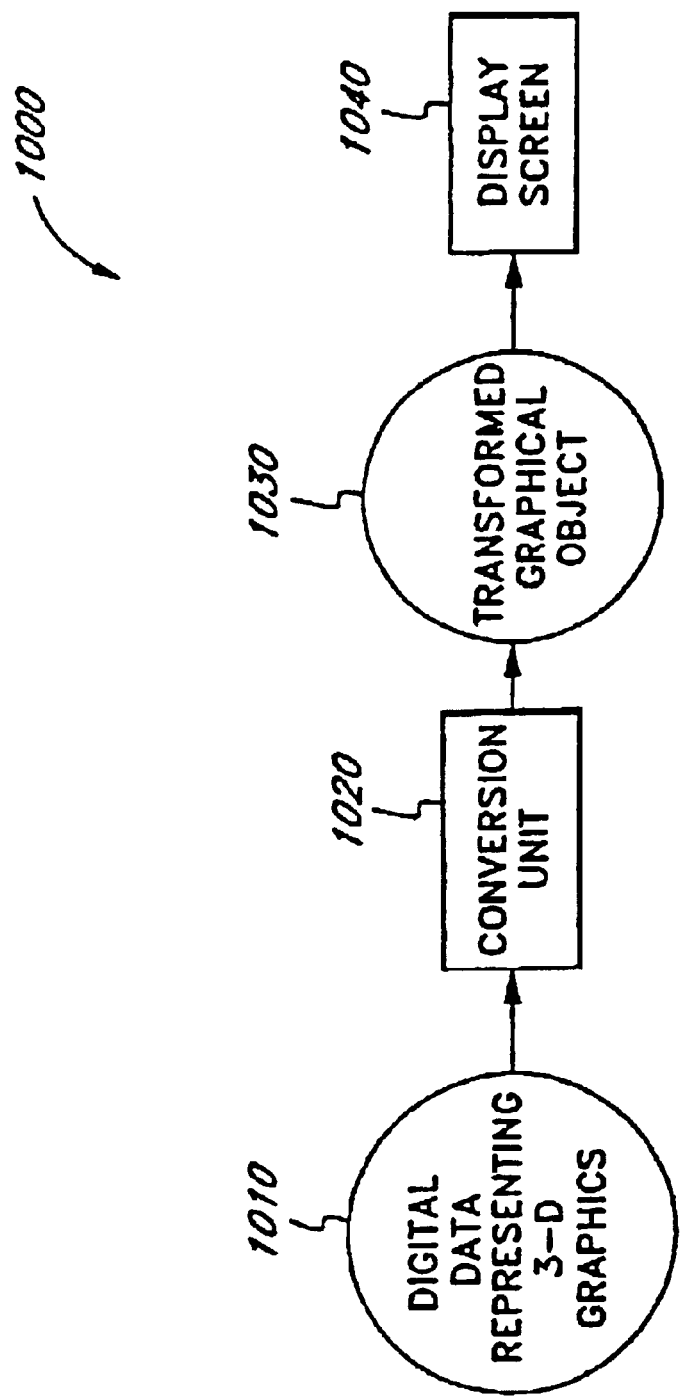
FIG. 10 is a general block diagram illustrating the use of matrix multiplication based on horizontal or inter-add operations, in rendering graphical objects in animation.

FIG. 10 is a general block diagram illustrating the use of matrix multiplication based on a horizontal or intra-add operation for rendering graphical objects in animation according to one embodiment of the invention. FIG. 10 shows a computer system 1000 containing digital data 1010 representing 3-dimensional (3D) graphics. The digital data 1010 may be read from a storage medium or generated real time. At sometime, the conversion unit 1020 alters data using 3D geometry (e.g., by performing a 3D transformation) through the implementation of matrix multiplication based on a horizontal add operation to rotate a 3D object in providing animation. The resulting graphical object 1030 (e.g., see FIGS. 4A–4G) is then displayed on a screen display 1040 using well known techniques. While FIG. 10 shows that the resulting graphical object 1030 is displayed, the resulting graphical object may alternatively be stored, transmitted, etc.

In one embodiment, the computer system 100 shown in FIG. 5 is used to implement the computer system 1000 from FIG. 10. In this embodiment, the digital data 1010 from FIG. 10 is any data stored in the storage device 110 representing 3D graphics. In one embodiment, the conversion unit 1020 from FIG. 8 is implemented using the processor 110 and the code 195 to alter data using 3D geometry. For example, data is altered to perform a transformation. In this embodiment, the processor 110, executing the code 195, performs the transformation and stores the transformed data 1030 for display.

CONCLUSION

The intra-add operation facilitates the efficient performance of multi-dimensional computations. It further increases code density by eliminating the need for the rearrangement of data elements and the corresponding rearrangement operations.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A system comprising:
   a storage device to store an executable code;
   a processor coupled with the storage device to execute said executable code, being responsive to said executable code comprising a first instruction specifying a first source operand having a first plurality of N data elements and a second source operand having a second plurality of N data elements, said processor:
   to access the first source operand to add at least a first pair of elements of the first plurality of N data elements producing a first sum,
   to access the second source operand to add at least a second pair of elements of the second plurality of N data elements producing a second sum, and
   to access a destination operand to store a third plurality of N data elements comprising the first sum and the second sum.

2. The system of claim 1 further comprising at least one device selected from a group consisting of:
   a display device coupled with the processor to store transformed graphical objects responsive at least in part to the processor executing said executable code;
   a hard copy device coupled with the processor to print graphical objects responsive at least in part to the processor executing said executable code; and
   a video digitizing device coupled with the processor to transfer digital video data elements responsive at least in part to the processor executing said executable code.

3. The system of claim 1 further comprising:
   a cursor control coupled with the processor, the processor responsive at least in part to said cursor control and said executable code to transform a graphical object.

4. The system of claim 1, the processor responsive at least in part to said executable code to:
   multiply each data element of a first row of a matrix source to each respective data element of a vector source to generate the first plurality of N data elements of the first source operand,
   multiply each data element of a second row of the matrix source to each respective data element of the vector source to generate a second plurality of N data elements of the second source operand.

5. An animation graphics system comprising:
   a storage device to store an executable code;
   a processor coupled with the storage device to generate transformed graphical objects responsive at least in part to executing said executable code, being responsive to said executable code comprising a first instruction specifying a first source operand having a first plurality of N data elements and a second source operand having a second plurality of N data elements, said processor:
   to access the first source operand to add at least a first pair of elements of the first plurality of N data elements producing a first sum,
   to access the second source operand to add at least a second pair of elements of the second plurality of N data elements producing a second sum,
   to access a destination operand to store a third plurality of N data elements comprising the first sum and the second sum; and
   a display device coupled with the processor to store transformed graphical objects for animation graphics responsive at least in part to the processor executing said executable code.

6. The animation graphics system of claim 5 wherein the first instruction specifies only two operands.

7. The animation graphics system of claim 6 wherein said first source operand specified is also the destination operand.

8. The animation graphics system of claim 5 wherein the first pair of elements are accessed from the least significant adjacent positions of the first source operand and the first sum is stored to the destination operand as the least significant data element of the third plurality of N data elements.

9. The animation graphics system of claim 8 wherein the second pair of elements are accessed from the most significant adjacent positions of the second source operand specified and the second sum is stored to the destination operand as the most significant data element of the third plurality of N data elements.

10. The animation graphics system of claim 5 wherein each of said first and second pluralities of N data elements comprises floating point data elements.

11. The animation graphics system of claim 5 wherein each of said first and second pluralities of N data elements comprises integer data elements.

12. The animation graphics system of claim 5 wherein N is equal to four.

13. The animation graphics system of claim 5 wherein each of said first and second source operands comprises 64 bits of packed data.

14. The animation graphics system of claim 5 wherein each of said first and second source operands comprises 128 bits of packed data.

15. A still image processing system comprising:
   a storage device to store an executable code;
   a processor coupled with the storage device to generate graphical objects responsive at least in part to executing said executable code, being responsive to said executable code comprising a first instruction specifying a first source operand having a first plurality of N data elements and a second source operand having a second plurality of N data elements, said processor:
   to access the first source operand to add at least a first pair of elements of the first plurality of N data elements producing a first sum,
   to access the second source operand to add at least a second pair of elements of the second plurality of N data elements producing a second sum,
   to access a destination operand to store a third plurality of N data elements comprising the first sum and the second sum; and
   a hard copy device coupled with the processor to print graphical objects of still images responsive at least in pail to the processor executing said executable code.

16. The still image processing system of claim 15 wherein the first instruction specifies only two operands.

17. The still image processing system of claim 16 wherein said specification of the first source operand also specifies the destination operand.

18. The still image processing system of claim 15 wherein the second pair of elements are accessed from the most significant positions of the second source operand specified and the second sum is stored to the destination operand as the most significant data element of the third plurality of N data elements.

19. The still image processing system of claim 18 wherein the first pair of elements are accessed from the least significant positions of the first source operand and the first sum is stored to the destination operand as the least significant data element of the third plurality of N data elements.

20. The still image processing system of claim 15 wherein said first and second pluralities of N data elements comprises floating point data elements.

21. The still image processing system of claim 15 wherein said first and second pluralities of N data elements comprise integer data elements.

22. The still image processing system of claim 21 wherein N is equal to four.

23. The still image processing system of claim 22 wherein each of said first and second source operands comprises 64 bits of packed data.

24. The still image processing system of claim 22 wherein each of said first and second source operands comprises 128 bits of packed data.

25. The still image processing system of claim 15 wherein N is equal to two.

26. The still image processing system of claim 15 wherein said processor is further responsive to said executable code comprising a second instruction specifying a third source operand having a fourth plurality of N data elements and a fourth source operand having a fifth plurality of N data elements to decode the second instruction, and responsive to decoding the second instruction:
to access the third source operand to perform a subtraction on at least a third pair of elements of the fourth plurality of N data elements producing a first difference,
to access the fourth source operand to perform a subtraction on at least a fourth pair of elements of the fifth plurality of N data elements producing a second difference,
to access a second destination operand to store a sixth plurality of N data elements comprising the first difference and the second difference.

27. A digital motion video system comprising:
a storage device to store an executable code;
a processor coupled with the storage device to process digital motion video data elements responsive at least in part to executing said executable code, being responsive to said executable code comprising a first instruction specifying a first source operand having a first plurality of N data elements and a second source operand having a second plurality of N data elements, said processor:
to access the first source operand to add at least a first pair of elements of the first plurality of N data elements producing a first sum,
to access the second source operand to add at least a second pair of elements of the second plurality of N data elements producing a second sum,
to access a destination operand to score a third plurality of N data elements comprising the first sum and the second sum; and
a video digitizing device coupled with the processor to transfer digital motion video data elements responsive at least in part to the processor executing said executable code.

28. The digital motion video system of claim 27 wherein the first instruction explicitly specifies exactly two operands.

29. The digital motion video system of claim 28 wherein a location specified for the first source operand is also for the destination operand.

30. The digital motion video system of claim 27 wherein each data element of said first and second pluralities of N data elements is a floating point data element.

31. The digital motion video system of claim 27 wherein each data element of said first and second pluralities of N data elements is an integer data element.

32. The digital motion video system of claim 27 wherein N is at least four.

33. The digital motion video system of claim 32 wherein the first pair of elements are accessed from the two least significant positions of the first source operand and the first sum is stored to the least significant position of the destination operand.

34. The digital motion video system of claim 33 wherein the second pair of elements are accessed from the two most significant positions of the second source operand specified and the second sum is stored to the most significant position of the destination operand.

35. The digital motion video system of claim 32 wherein each of said first and second source operands comprises 64 bits of packed data.

36. The animation graphics system of claim 32 wherein each of said first and second source operands comprises 128 bits of packed data.

37. The digital motion video processing system of claim 27 wherein N is equal to two.

38. The digital motion video processing system of claim 27 wherein being responsive to said executable code comprising a second instruction specifying a third source operand having a fourth plurality of N data elements and a fourth source operand having a fifth plurality of N data elements, said processor is to decode the second instruction, and further responsive to the decoding of the second instruction:
to access the third source operand to perform a subtraction on at least a third pair of elements of the fourth plurality of N data elements producing a first difference,
to access the fourth source operand to perform a subtraction on at least a fourth pair of elements of the fifth plurality of N data elements producing a second difference,
to access a second destination operand to store a sixth plurality of N data elements comprising the first difference and the second difference.

39. A graphical workstation system comprising:
a storage device to store an executable code;
a processor coupled with the storage device to transform a graphical object at least in part by executing said executable code, being responsive to said executable code comprising a first instruction specifying a first source operand having a first plurality of N data elements and a second source operand having a second plurality of N data elements, said processor:
to access the first source operand to add at least a first pair of elements of the first plurality of N data elements producing a first sum,
to access the second source operand to add at least a second pair of elements of the second plurality of N data elements producing a second sum,
to access a destination operand to store a third plurality of N data elements comprising the first sum and the second sum; and
a cursor control coupled with the processor, the processor responsive at least in part to said cursor control and said executable code to transform a graphical object.

40. A transformation system comprising:
a storage medium to store a digital graphics data;
a machine-accessible medium having an executable code;
a conversion unit to access the machine-accessible medium and responsive at least in part to said executable code comprising a first instruction, the first instruction specifying a first operand and a second operand, to:
multiply each data element of a first row of a matrix source to each respective data element of a vector source to generate a first plurality of N data elements of the first operand, multiply each data element of a second row of the matrix source to each respective data element of the vector source to generate a second plurality of N data elements of the second operand, add at least a first pair of elements of the first plurality of N data elements to generate a first data element of a packed result responsive to said first instruction, and add at least a second pair of elements of the second plurality of N data elements to generate a second data element of the packed result responsive to said first instruction.

41. The transformation system of claim 40 wherein each of said first and second pluralities of N data elements comprises floating point data elements.

42. The transformation system of claim 40 wherein each of said first and second pluralities of N data elements comprises integer data elements.

43. The transformation system of claim 40 wherein each of said first and second operands comprises at least 64 bits of packed data.

44. The transformation system of claim 40 wherein each of said first and second operands comprises at least 128 bits of packed data.

45. A computer system comprising:

a first machine-accessible medium having stored thereon a first plurality of control signals and when accessed by a machine, causing said machine to access a first control signal specifying a first source operand having a first plurality of data elements and a second source operand having a second plurality of data elements and to generate one or more control signals to enable a horizontal addition operation;

a second machine-accessible medium to store a second plurality of control signals to enable operations of a packed instruction set including said one or more control signals to enable a horizontal addition operation;

at least one execution unit to access said one or more control signals to enable a horizontal addition operation of the second machine-accessible medium causing said at least one execution unit to:

add at least a first pair of elements of the first plurality of data elements to generate a first sum element of a first packed result, and add at least a second pair of elements of the second plurality of data elements to generate a second sum element of the first packed result.

46. The computer system of claim 45 wherein each of said first and second pluralities of data elements comprises floating point data elements.

47. The computer system of claim 45 wherein each of said first and second pluralities of data elements comprises integer data elements.

48. The computer system of claim 45 said first machine-accessible medium causing said machine to access a second control signal specifying a third source operand having a third plurality of data elements and a fourth source operand having a fourth plurality of data elements and to generate one or more control signals to enable a horizontal subtract operation;

the second machine-accessible medium including said one or more control signals to enable a horizontal subtraction operation; and said at least one execution unit to access said one or more control signals to enable a horizontal subtraction operation of the second machine-accessible medium causing said at least one execution unit to:

perform a subtraction on at least a third pair of elements of the third plurality of data elements to generate a first difference element of a second packed result, and perform a subtraction on at least a second pair of elements of the fourth plurality of data elements to generate a second difference element of the second packed result.

49. The computer system of claim 45 wherein said first machine-accessible medium comprises a look-up table.

50. The computer system of claim 45 wherein a location specified for the first source operand is also for the first packed result.

* * * * *

UNITED STATES PATENT AND TRADEMARK OFFICE
CERTIFICATE OF CORRECTION

PATENT NO. : 6,961,845 B2
DATED : November 1, 2005
INVENTOR(S) : Roussel

It is certified that error appears in the above-identified patent and that said Letters Patent is hereby corrected as shown below:

Column 10,
Line 48, delete "pail" and insert -- part --.

Signed and Sealed this

Thirty-first Day of January, 2006

JON W. DUDAS
*Director of the United States Patent and Trademark Office*